United States Patent Office 3,082,060
Patented Mar. 19, 1963

3,082,060
TREATMENT OF SODIUM CARBONATE
Stanley W. Snyder, Corpus Christi, Tex., assignor, by mesne assignments, to Pittsburgh Plate Glass Company
No Drawing. Filed Apr. 9, 1959, Ser. No. 805,123
7 Claims. (Cl. 23—63)

This invention relates to a novel method of improving the color of alkali metal carbonates, such as sodium carbonate, sodium bicarbonate, sodium sesquicarbonate, and like alkali metal carbonates. The color of these materials sometimes is found to be poor, particularly when the materials are recovered from natural deposits such as occur in the brines of certain lakes and in natural solid strata. Such materials may be recovered from such deposits in the form of a solution from which the alkali metal carbonate is crystallized in a purified form.

According to this invention it has been found that the color of such alkali metal carbonates may be materially improved by introducing active or available chlorine into an aqueous suspension (including solutions and slurries) of the carbonate prior to crystallization thereof. Various materials are known to contain active chlorine or positive or oxidizing chlorine ($Cl^+$) and are useful for this purpose. The best known material useful for this purpose is elemental chlorine. However, hypochlorous acid or alkali metal hypochlorites or alkaline earth metal hypochlorites as well as N-chloro compounds, such as nitrogen trichloride, chlorinated melamine, N-chloro cyanuric acid or like materials which contain active or available chlorine, may be used.

The amount of elemental chlorine or compound containing available or active chlorine added to the solution is small, usually being enough to leave in the solution a small residue of available or oxidizing chlorine (as alkali metal hypochlorite) in the range of about 0.5 to 100 parts by weight of available chlorine per million parts by weight of alkali metal aqueous carbonate solution or an aqueous slurry of alkali metal carbonate crystals, rarely in excess of one percent by weight of the alkali metal carbonate.

After the solution or slurry is thus treated it is processed acording to suitable method well known in the art (crystallization, evaporation, and the like) to recover the solid alkali metal carbonate in the desired form, i.e., bicarbonate, sesquicarbonate, light soda ash, dense ash or the like.

The following example is illustrative:

Example I

A slurry of sodium carbonate monohydrate containing 30 percent by weight of suspended solids was made in a mix tank by mixing soda ash with water. This slurry was chlorinated to 3.5 parts per million of residual chlorine as hypochlorite and pumped into a pressure reactor. The temperature of the slurry inside the reactor was raised to 120° C. and held at this temperature for 45 minutes. The steam flow to the jacket was cut off and the slurry temperature was reduced by atmospheric cooling. After the transition from the anhydrous state to the monohydrate state had taken place, a portion was fed to a retention tank. The reactor was then filled with more sodium carbonate slurry and the temperature raised to 120° C. for 30 minutes. At this point, continuous flows were started from the mix tank to the pressure reactor and from the reactor to the retention tank. The slurry in the mix tank was maintained at 70° C. throughout the run. The slurry was flashed directly into the retention tank where the temperature was usually in the range of 90 to 100° C. Periodically, approximately every 30 minutes, 5 to 8 gallons of slurry was withdrawn from the retention tank and centrifuged. The centrifuge cake was washed with demineralized water equal to 10 percent of the cake weight. The wash liquor was added to the mother liquor. The mother liquor and wash water were then weighed and recycled to the mix tank. Enough soda ash and boiler condensate were added to maintain a slurry containing 30 percent by weight of suspended solids. No purge was made on the system. Approximately every 5 hours, a centrifuge load was dried to produce dry soda ash in a rotary dryer. The original soda ash had an average chemical composition as shown below (expressed as weight percent):

| | |
|---|---|
| $Na_2CO_3$ | 98.0 |
| NaCl | 0.35 |
| Boron | 0.10 |
| $Na_2SO_4$ | 0.30 |
| $SiO_2$ | 0.50 |

The soda ash thus purified was very white and had the following composition:

Soda ash:

| | |
|---|---|
| $Na_2CO_3$ | 99.91 |
| NaCl | 0.01 |
| Boron | 0.0015 |
| $Na_2SO_4$ | 0.03 |
| $SiO_2$ | 0.018 |

Mother liquor:

| | |
|---|---|
| NaCl | 0.29 |
| Boron | 0.08 |
| $Na_2SO_4$ | 0.30 |
| $SiO_2$ | 0.47 |
| $Na_2CO_3$ | 30.4 |

This material was much whiter in appearance than soda ash similarly purified but without the use of chlorine.

While the process in the above example is directed to use of the invention in connection with a special purification process in which soda ash is produced, the invention is not limited thereto. Thus, natural sodium carbonate brines are conventionally treated with $CO_2$ to precipitate sodium sesquicarbonate or bicarbonate which is recovered or is calcined to light ash. These brines may be treated with elemental chlorine or like active chlorine composition prior to or during the carbonation. Ammonia soda liquors or slurries containing sodium bicarbonate or sodium carbonate hydrate dissolved or suspended therein may be treated in the same way, and the same is true of the corresponding potassium salts.

The chlorine may be introduced by various means, such as by direct addition to the slurry or suspension or a solution of sodium hypochlorite may be formed and added to the suspension.

Although the present invention has been described with reference to the specific details of certain embodiments thereof, it is not intended that such details shall be regarded as limitations upon the scope of the invention except insofar as included in the accompanying claims.

What is claimed:

1. In the process of recovering an alkali metal carbonate from an aqueous suspension of said alkali metal carbonate, the improvement which comprises increasing the whiteness of the alkali metal carbonate by introducing into the suspension a small amount of elemental chlorine prior to the recovery of said alkali metal carbonate.

2. In the process of recovering an alkali metal carbonate from an aqueous suspension the carbonate content of which is primarily alkali metal carbonate, the improvement which comprises increasing the whiteness of the alkali metal carbonate by introducing into the suspension a small amount of a composition containing active chlorine prior to the recovery of said alkali metal carbonate.

3. The process of claim 2 wherein the alkali metal is sodium.

4. In the process of recovering an alkali metal carbonate from an aqueous suspension the carbonate content of which is primarily alkali metal carbonate, the improvement which comprises increasing the whiteness of the alkali metal carbonate by introducing into the suspension a small amount of a composition containing active chlorine sufficient to leave in the suspension a small amount of hypochlorite prior to the recovery of said alkali metal carbonate.

5. In the process of recovering alkali metal carbonate from an aqueous suspension of said alkali metal carbonate, the improvement which comprises increasing the whiteness of the alkali metal carbonate obtained therefrom by dispersing solid alkali metal carbonate in water to form an aqueous slurry thereof, introducing into the suspension a small amount of elemental chlorine, and thereafter recovering the solid alkali metal carbonate from the slurry.

6. In the process of recovering an alkali metal carbonate from an aqueous suspension of said alkali metal carbonate, the improvement which comprises increasing the whiteness of the alkali metal carbonate recovered therefrom by dispersing solid alkali metal carbonate in water to produce an aqueous slurry thereof, introducing into the slurry a small amount of a composition containing active chlorine, and thereafter recovering solid alkali metal carbonate from the resulting slurry, the solids content of which consists essentially of alkali metal carbonate.

7. The process of claim 6 wherein the alkali metal is sodium.

References Cited in the file of this patent

UNITED STATES PATENTS

| | | |
|---|---|---|
| 1,984,342 | Hellmers | Dec. 11, 1934 |
| 2,798,790 | Pike | July 9, 1957 |
| 2,829,110 | Robson | Apr. 1, 1958 |
| 2,887,360 | Hoekje | May 19, 1959 |
| 2,989,369 | Osborne | June 30, 1961 |

OTHER REFERENCES

Gregory: "Uses and Applications of Chemicals and Related Materials," 1939, pages 139 and 542.

Mellor: "Comprehensive Treatise on Inorganic and Theoretical Chemistry," Longmans, Green and Co., 1922. vol. 2, p. 91.